US009128657B2

(12) United States Patent
Kanakubo

(10) Patent No.: US 9,128,657 B2
(45) Date of Patent: Sep. 8, 2015

(54) PRINTING APPARATUS HAVING WIRELESS COMMUNICATION FUNCTION, AND CONTROL METHOD FOR PRINTING APPARATUS

(71) Applicant: CANON KABUSHIKI KAISHA, Tokyo (JP)

(72) Inventor: Yukio Kanakubo, Yokohama (JP)

(73) Assignee: Canon Kabushiki Kaisha, Tokyo (JP)

(*) Notice: Subject to any disclaimer, the term of this patent is extended or adjusted under 35 U.S.C. 154(b) by 34 days.

(21) Appl. No.: 13/693,968

(22) Filed: Dec. 4, 2012

(65) Prior Publication Data
US 2013/0148158 A1 Jun. 13, 2013

(51) Int. Cl.
G06K 15/00 (2006.01)
G06F 3/12 (2006.01)
G06F 11/07 (2006.01)
G06F 21/60 (2013.01)
G06F 3/00 (2006.01)

(52) U.S. Cl.
CPC .......... G06F 3/1292 (2013.01); G06F 11/0757 (2013.01); G06F 21/608 (2013.01); G06F 3/1222 (2013.01); G06F 3/1236 (2013.01); G06F 3/1238 (2013.01); G06F 2221/2137 (2013.01)

(58) Field of Classification Search
CPC ..... H04W 48/08; H04W 48/10; H04W 48/16; H04W 48/18; H04W 80/00; H04W 72/02; H04W 72/0433; H04W 12/00; H04W 12/08; G06F 21/608; G06F 3/1292; G06F 3/1222; G06F 3/1236–3/1238

USPC ........ 358/1.11–1.18; 726/2–5, 16, 17, 26, 27; 713/103, 168, 184; 380/270
See application file for complete search history.

(56) References Cited

U.S. PATENT DOCUMENTS

| | | | | |
|---|---|---|---|---|
| 2004/0146327 A1* | 7/2004 | Hata et al. | | 400/76 |
| 2005/0048953 A1* | 3/2005 | Ohara | | 455/412.1 |
| 2005/0054342 A1* | 3/2005 | Otsuka | | 455/426.2 |
| 2007/0201081 A1* | 8/2007 | Murayama | | 358/1.15 |
| 2008/0100865 A1* | 5/2008 | Okano | | 358/1.15 |
| 2010/0082978 A1* | 4/2010 | Suzuki et al. | | 713/168 |
| 2010/0082999 A1* | 4/2010 | Ando et al. | | 713/183 |
| 2010/0165879 A1* | 7/2010 | Gupta et al. | | 370/254 |
| 2011/0211219 A1* | 9/2011 | Bradley et al. | | 358/1.15 |
| 2011/0235085 A1* | 9/2011 | Jazayeri et al. | | 358/1.14 |
| 2011/0281557 A1* | 11/2011 | Choi et al. | | 455/411 |
| 2012/0044522 A1* | 2/2012 | Park et al. | | 358/1.15 |

FOREIGN PATENT DOCUMENTS

JP 2007-223222 A 9/2007

OTHER PUBLICATIONS

Wi-Fi Peer-To-Peer (P2P) Technical Specification. Version 1.2. Copyright 2010. pp. 45-51.*

(Continued)

Primary Examiner — Chad Dickerson
(74) Attorney, Agent, or Firm — Canon U.S.A., Inc., IP Division

(57) ABSTRACT

In a printing apparatus that prints a PIN code on a sheet, the printing apparatus performs control to suppress setting failure of WPS due to time-out at least until printing of the PIN code is completed (successfully printed).

7 Claims, 8 Drawing Sheets

(56) References Cited

OTHER PUBLICATIONS

Brother Multi-Protocol On-board Ethernet Print Server and Wireless (IEEE 802.11b/g) Ethernet Print Server Network User's Guide. HL-2150N, HL-2170W. Web Address: http://www.uvm.edu/cosmolab/om/brother/html/nug/index.html. Section 7: Wireless configuration using the PIN method of Wi-Fi Protected Setup (for HL-2170W).*

* cited by examiner

FIG.6

PIN = 00112233

FIG.8

```
PIN = 00112233

THE ABOVE PIN CODE
IS VALID UNTIL 17:35.
```

PRINTING APPARATUS HAVING WIRELESS COMMUNICATION FUNCTION, AND CONTROL METHOD FOR PRINTING APPARATUS

BACKGROUND OF THE INVENTION

1. Field of the Invention

The present invention relates to a printing apparatus having a wireless communication function, and more particularly, to a printing apparatus that performs security setting when the printing apparatus performs wireless communication.

2. Description of the Related Art

In recent years, a wireless local area network (LAN) communication function has been installed into many information devices. Printing apparatuses are also no exception, and product which include a wireless LAN communication interface as standard equipment and can wirelessly connect with a host computer have increased.

However, when a user performs security setting of the wireless LAN communication, some knowledge of the wireless LAN is required, which is very hard and difficult to understand for beginners. Therefore, a protocol for automatically performing complicated security setting of the wireless LAN has been defined. As a representative protocol, a system referred to as Wireless Fidelity (Wi-Fi) Protected Setup (WPS) is in widespread use.

The WPS includes two types of authentication methods for connecting a device to a wireless LAN access point (hereinafter, simply referred to as an access point). One is a push-button method and the other is a personal identification number (PIN) code method.

The PIN code method is to perform setting after performing authentication by the following processing. More specifically, according to the PIN code method, when a printing apparatus inputs a four- or eight-digit number referred to as a PIN code generated in advance to an access point of a connection destination, authentication of the printing apparatus and wireless LAN connection setting (security setting) are automatically performed between the printing apparatus and the access point.

By the way, there are some printing apparatuses which do not include a display device such as an liquid crystal display (LCD) for displaying character strings on the printing apparatus main body with the purpose of cost reduction. In such a printing apparatus which does not include a display device, when the PIN code method of the WPS is executed, the PIN code cannot be input to an access point, since the generated PIN code cannot be displayed. Therefore, Japanese Patent Application Laid-Open No. 2007-223222 adopts a method, instead of displaying information necessary for wired LAN setting, for printing the information on a sheet to allow a user to visually check it.

If a PIN code is not input to an access point within a predetermined time, after starting activation of the WPS in the PIN code method, a time-out occurs and setting of the wireless LAN fails. This is a behavioral specification of the WPS for making a dangerous time period in terms of security such as illegal connection (unauthorized access) from the outside as short as possible.

Japanese Patent Application Laid-Open No. 2007-223222 adopts a method for printing a PIN code on a sheet when an instruction to start activation of the WPS in the PIN code method is issued. However, when the PIN code is printed by the printing apparatus, sometimes sheets may not be stored in a sheet feed cassette, or paper clogging error may occur. If such an error occurs when the PIN code is printed, there is a possibility that it takes time to resolve the error, the time-out based on the above-described behavioral specification occurs, and setting of the wireless LAN fails. Conventionally, failure of the wireless LAN setting based on such an error of printing has not been taken into consideration.

SUMMARY OF THE INVENTION

The present invention is directed to a technique for minimizing failure in setting for wireless communication.

According to an aspect of the present invention, a printing apparatus communicable with an external apparatus on a network via an access point includes an instruction unit configured to issue an instruction to start setting of wireless communication with use of a personal identification number (PIN) code method, a transmission unit configured, if an instruction to start setting of the wireless communication is issued, to transmit a PIN code to the access point, a printing unit configured to print the PIN code, a setting unit configured, if information for performing wireless communication is received from the access point within a predetermined time, to set the received information, and a control unit configured to suppress failure of setting by the setting unit due to a lapse of the predetermined time, at least until the printing unit properly prints the PIN code.

According to the present invention, failure in setting for wireless communication can be minimized.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIG. 6 is an example of a printing result of a PIN code.

FIG. 8 is an example of a printing result of a PIN code in another exemplary embodiment.

DESCRIPTION OF THE EMBODIMENTS

Various exemplary embodiments, features, and aspects of the invention will be described in detail below with reference to the drawings.

[Descriptions of WPS PIN Code Method]

A first exemplary embodiment is described below. First, a security information setting procedure for the wireless LAN using the WPS in the PIN code method is described referring to a sequence diagram illustrated in FIG. 1.

Figure 1:
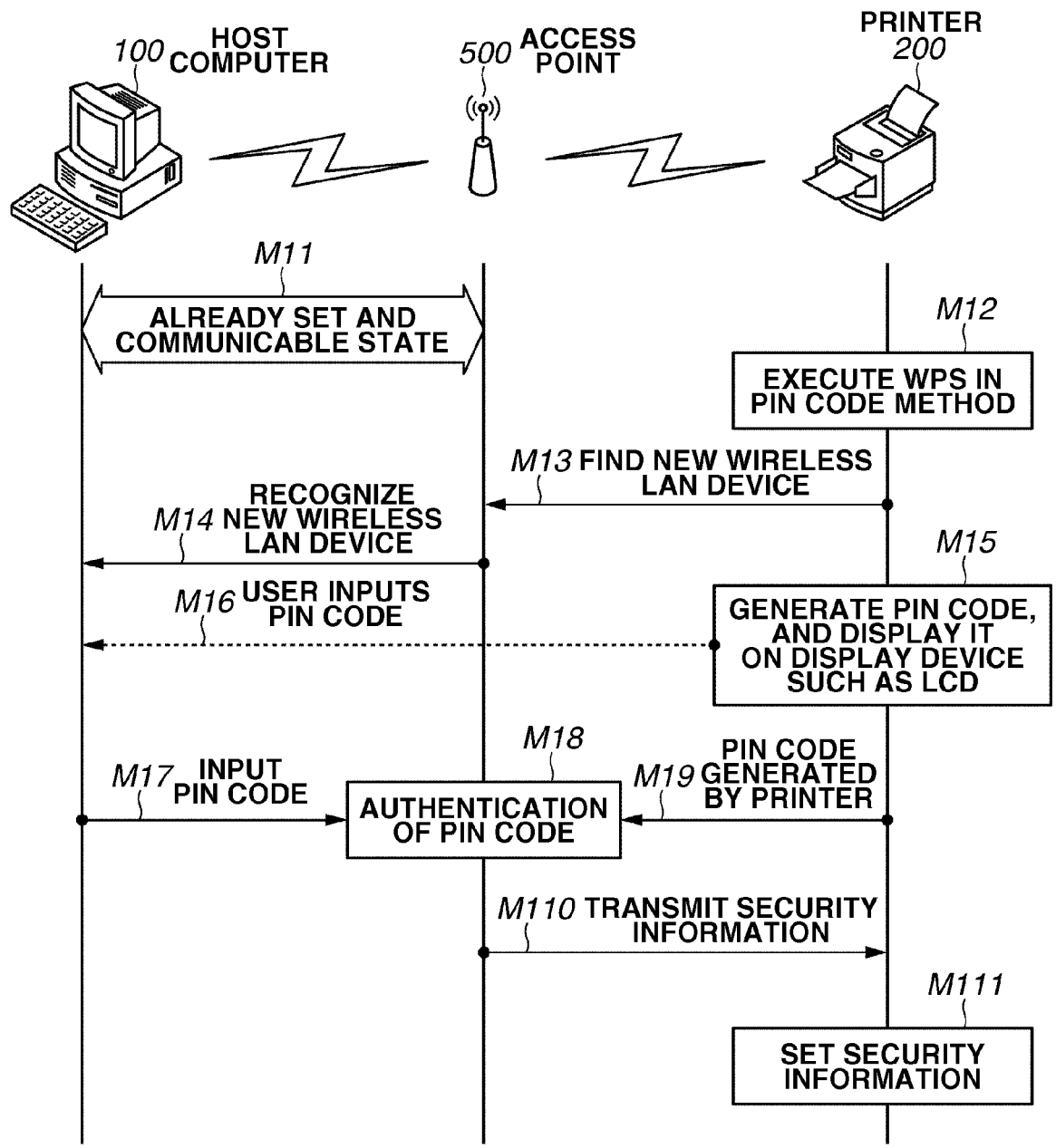
FIG. 1 is a sequence diagram illustrating a wireless LAN security automatic setting procedure using the WPS in the PIN code method.

In FIG. 1, in step M11, it is assumed that a host computer 100 and an access point 500 are in a state in which they have already finished setting of the wireless LAN and are communicable with each other. Then, in order to cause a printer 200 to communicate with the host computer 100 on the network, the following setting is performed on the printer 200. More specifically, in step M12, when a user executes the WPS in the PIN code method from an operation panel in the printer 200, in step M13, the access point 500 corresponding to the WPS detects the printer 200 as a new wireless LAN device. Then, in step M14, the access point 500 causes the connected host computer 100 to recognize that a new wireless LAN device has been detected.

On the other hand, in step M15, the printer 200 generates a four- or eight-digit number referred to as a PIN code, and displays the PIN code on a display device such as an LCD provided on the operation panel, or prints the PIN code on a sheet by a printing mechanism unit in the printer 200. In step M16, when the PIN code is recognized by the user, the host computer 100 receives from a setting application an input of the PIN code from the user within a predetermined time. In step M18, the access point 500 compares the PIN code input by the user (in step M17) and the PIN code generated by the printer 200 (in step M19), and performs authentication of the printer 200 (i.e., the wireless LAN device). In step M110, when the wireless LAN device is authenticated, security information (e.g., a service set identifier (SSID), Wired Equivalent Privacy (WEP)/Wi-Fi Protected Access (WPA) key, or the like) is transmitted to the printer 200. In step M111, setting of the wireless LAN is automatically performed.

According to the procedures described above, security setting of the wireless LAN is automatically executed using the WPS in the PIN code method.

[Descriptions of Laser Beam Printer]

Next, referring to FIG. 2, an internal structure of a rotary developing type laser beam printer to which the present exemplary embodiment is applied will be described. The laser beam printer illustrated in FIG. 2 is an example of a printing apparatus, and the present exemplary embodiment can be applied to other types of printers, such as a tandem type (4 drum) laser beam printer, and an inkjet type printer.

Figure 2:
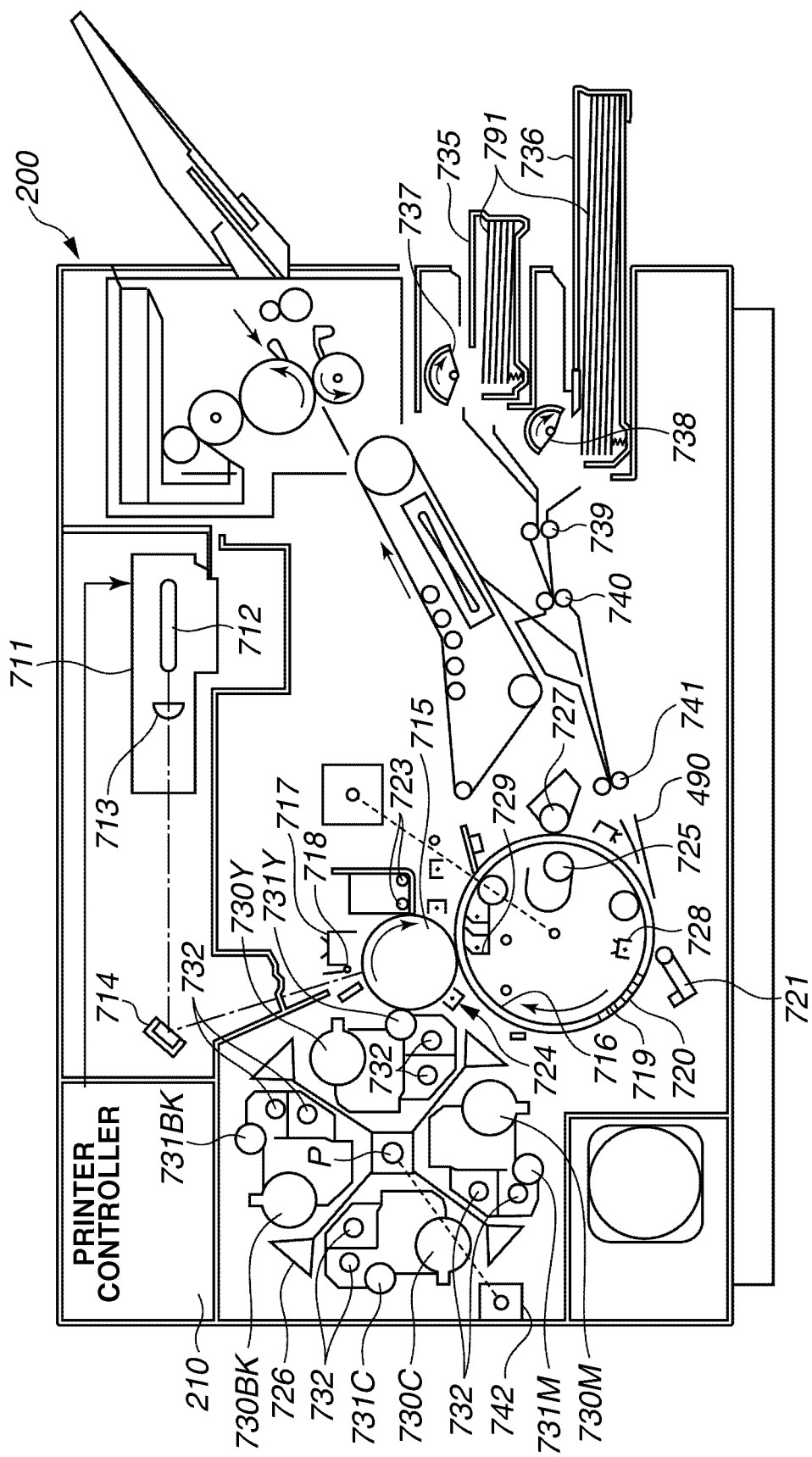
FIG. 2 is a cross-sectional view of an internal structure of a rotary developing type color laser beam printer (LBP).

In FIG. 2, a scanner 711 includes a laser output unit (not illustrated) for converting an image signal into an optical signal, a polygon mirror 712 formed by a polyhedron (e.g., octahedron), a motor (not illustrated) for rotating the polygon mirror 712, an f/θ lens (imaging lens) 713, and the like. A laser beam emitted from the laser output unit is reflected at one side surface of the polygon mirror 712, passes through the f/θ lens 713 and a reflection mirror 714, and performs raster scan linearly on a surface of a photosensitive drum 715 rotating in a direction indicated by an arrow in FIG. 2. Accordingly, an electrostatic latent image corresponding to an original image is formed on the surface of the photosensitive drum 715.

Around the photosensitive drum 715, a primary charging device 717, a whole surface exposure lamp 718, a cleaner unit 723 for collecting residual toner, which remains without being transferred, and a pre-transfer charging device 724 are disposed. A developing device unit 726 is a unit for developing an electrostatic latent image formed on the surface of the photosensitive drum 715 by laser exposure and includes the following configuration. Developing sleeves 731Y, 731M, 731C, and 731Bk contact with the photosensitive drum 715 to directly perform developing. Toner hoppers 730Y, 730M, 730C, and 730Bk store spare toners. Screws 732 transport developers. The sleeves (731Y, 731M, 731C, and 731Bk), the toner hoppers (730Y, 730M, 730C, and 730Bk), and the screws 732 are disposed around a center axis P of the developing device unit 726. Suffixes Y, M, C, and Bk attached to the above-described components each denote colors. That is "Y", "M", "C", and "Bk" respectively denote yellow, magenta, cyan, and black.

A developing device unit position sensor 742 detects a rotation position of the developing device unit 726. When a yellow toner image is formed, the developing device unit 726 performs yellow toner developing processing at a position illustrated in FIG. 2. When a magenta toner image is formed, the developing device unit 726 rotates around the center axis P in FIG. 2 so as to attach the developing sleeve 731M within the magenta developing unit to the photosensitive drum 715. The development of a cyan toner and a black toner are operated in the similar manner.

A transfer drum 716 transfers a toner image formed on the photosensitive drum 715 onto a sheet. An actuator plate 719 detects a movement position of the transfer drum 716. A position sensor 720 detects that the transfer drum 716 has moved to a home position when the actuator plate 719 comes close thereto. The actuator plate 719, the position sensor 720, a transfer drum cleaner 725, a sheet pressing roller 727, and a static eliminator 729 serving as a transfer charging device are disposed around the transfer drum 716.

Sheet feed cassettes 735 and 736 each store sheets (paper leaf 791). In the present exemplary embodiment, it is assumed that the sheet feed cassette 735 stores A4 sized sheets, and the sheet feed cassette 736 stores A3-sized sheets, for example. At the time of feeding and conveyance of sheets, a sheet is fed from the sheet feed cassette 735 or 736 by the sheet feeding roller 737 or 738.

Timing of feeding and conveying the sheet is taken by timing rollers 739, 740, and 741. After passing through the timing rollers, the sheet is guided by a paper guide 490 to winds around the transfer drum 716 while its leading edge is borne by a gripper 728, then the processing proceeds to an image formation process. Selection of either one of the sheet feed cassette 735 and 736 is determined by an instruction of a printer controller 210, and only the selected sheet feeding rollers are rotated. Through the above-described configuration, full-color printing based on YMCK four-colors is realized.

[Descriptions of Printer Control System]

Figure 3:
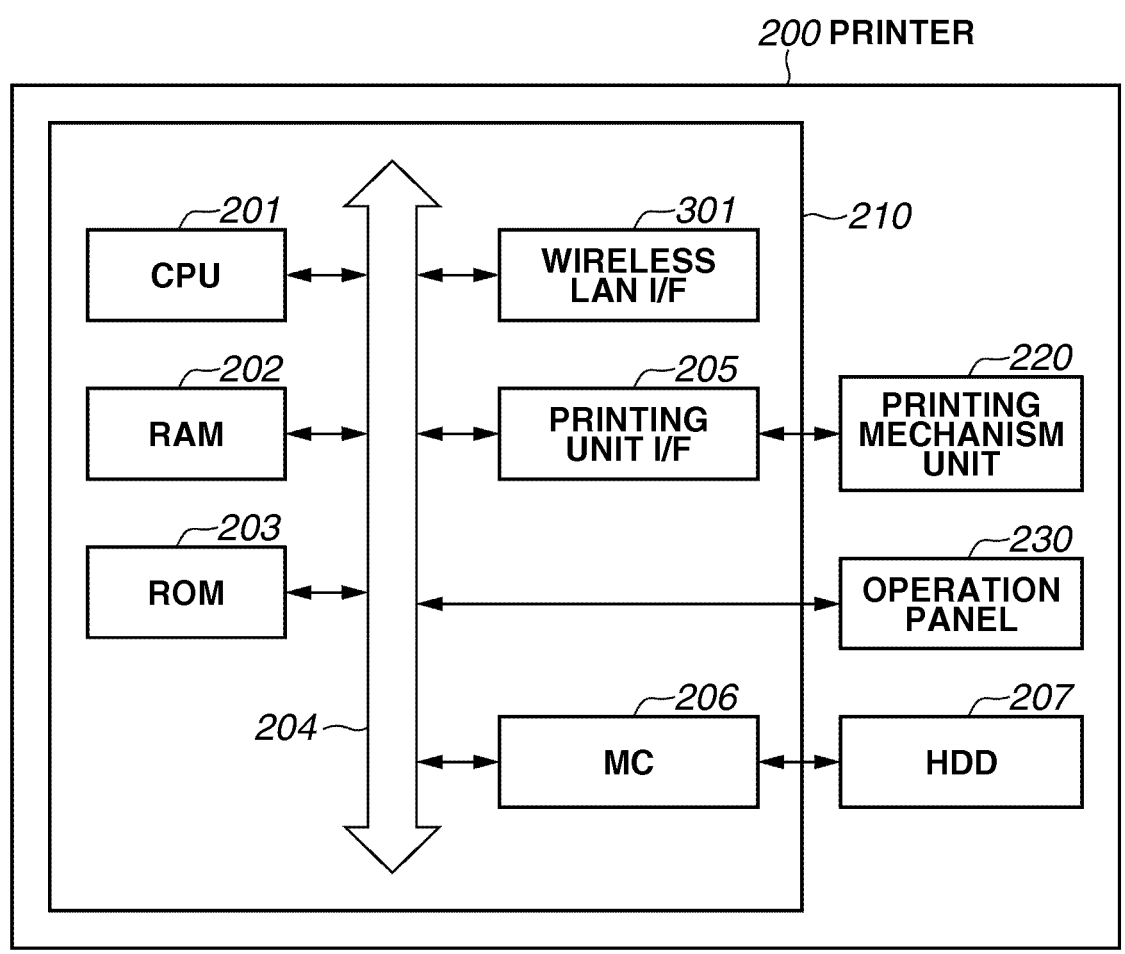
FIG. 3 is a block diagram illustrating a system configuration of the LBP in FIG. 2.

FIG. 3 is a block diagram illustrating a configuration of the printing apparatus according to the first exemplary embodiment. The configuration of the printing apparatus is described by taking the rotary developing type color laser beam printer (FIG. 2) as an example.

Figure 7:
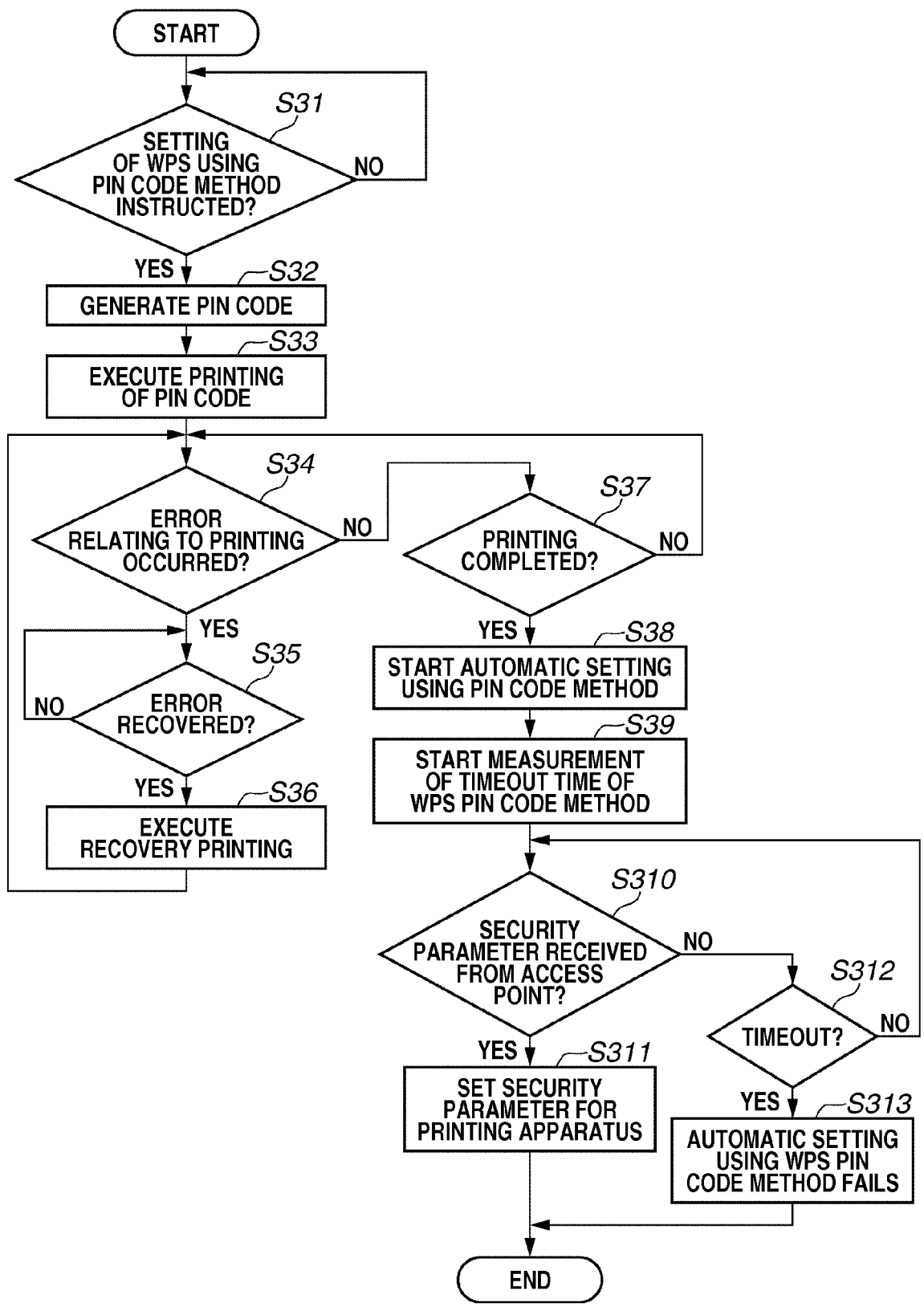
FIG. 7 is a flowchart illustrating a control procedure of the LBP in another exemplary embodiment.

In FIG. 3, the printer controller 210 is a controller board which is included within a main body of the printer 200 and controls an operation of the entire printer. A central processing unit (CPU) 201 comprehensively controls access to/from various devices connected to a system bus 204, based on a control program or the like stored in a read-only memory (ROM) 20. The CPU 201 outputs an image signal as output information to a printing mechanism unit 220 connected via a printing unit interface (I/F) 205. The ROM 203 stores therein control programs and the like as illustrated in flowcharts in FIG. 5 or FIG. 7.

In addition, the CPU 201 can bidirectionally communicate with the host computer 100 via a wireless LAN interface (I/F) 301. The wireless LAN I/F 301 performs transmission and reception of a control command and print data to/from the host computer 100 via the access point 500.

A random access memory (RAM) 202 serves as a main memory, a work area, or the like of the CPU 201, and can expand memory capacity by an optional RAM connected to an expansion port (not illustrated).

The RAM 202 may be used for a rendering memory for storing image data received from the host computer 100, a video signal ON/OFF information storage area, or other work areas, for example.

An operation panel 230 includes switches and the like for operating the printer 200. According to the present exemplary embodiment, the WPS in the PIN code method is started by a user pressing the switch on the operation panel 230.

A memory controller (MC) 206 controls access to/from a hard disk 207. The hard disk 207 is a storage device for storing print data received from the host computer 100, setting values of the printer 200, and the like.

Figure 4:
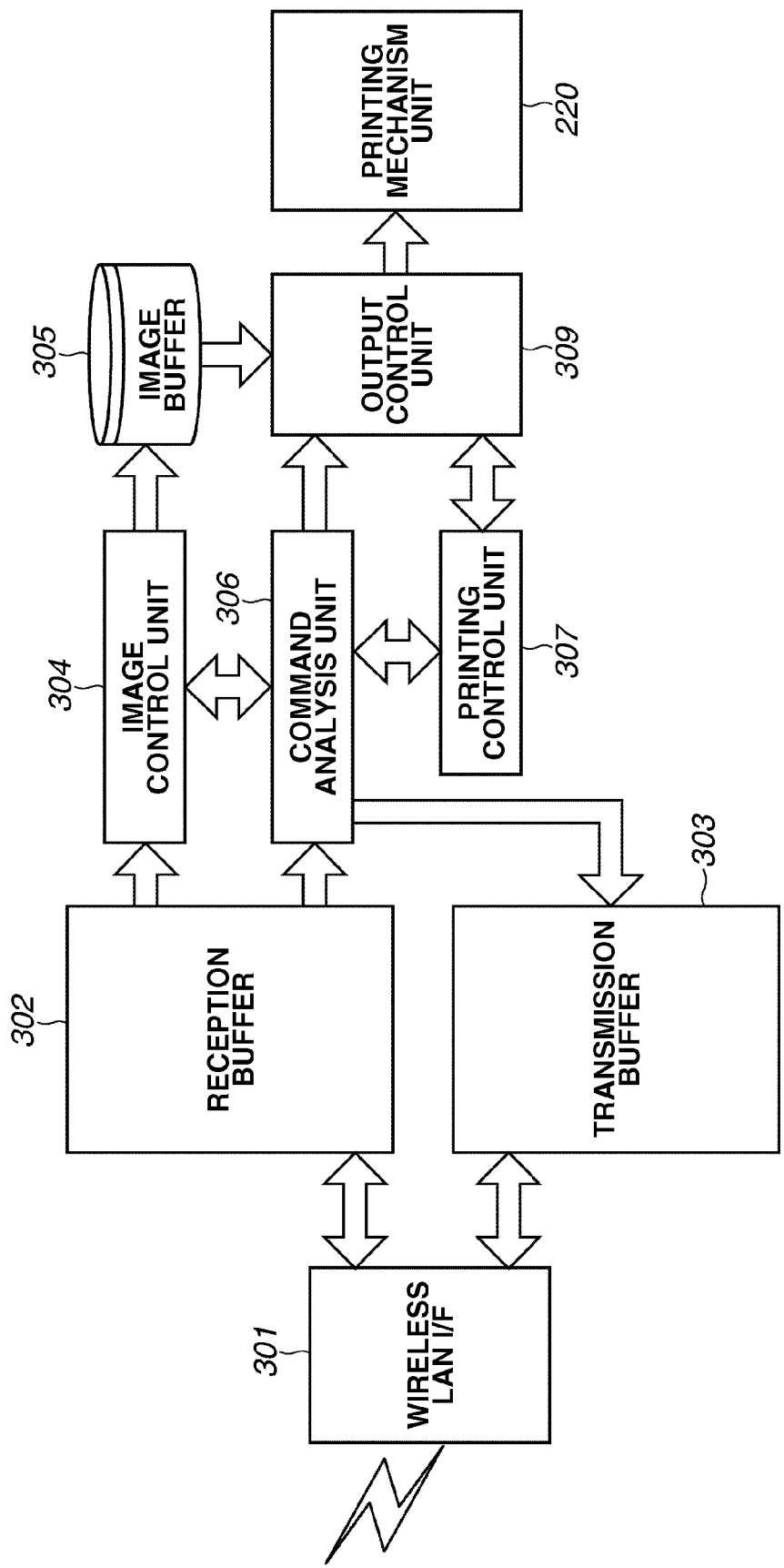
FIG. 4 is a block diagram illustrating a control configuration of the LBP.

FIG. 4 is a functional block diagram illustrating the processing executed in the printer 200 including the hardware configuration as illustrated in FIG. 3.

The printer controller 210 communicates with the wireless LAN I/F 301, and receives print data and other various commands. The printer controller 210 also transmits reply data in response to the received data to the host computer 100.

The print data received via the wireless LAN I/F 301 is sequentially accumulated in a reception buffer 302, and is read and processed by a command analysis unit 306 or an image control unit 304 as needed.

The command analysis unit 306 analyzes commands accumulated in the reception buffer 302. When determining to return data to the host computer 100, the command analysis unit 306 generates reply data and stores the reply data in a transmission buffer 303. Then, the reply data is transmitted to the host computer 100 by the wireless LAN I/F 301.

The command analysis unit 306 includes control programs complying with printing control command systems and printing job control languages. The command analysis unit 306 instructs the image control unit 304 to perform rendering processing with respect to a command relating to rendering. Further, the command analysis unit 306 instructs to a printing control unit 307 to perform processing with respect to a command relating to other than rendering such as a sheet feeding selection command and a reset command.

The image control unit 304 deletes a command portion from an image data command based on an instruction of the command analysis unit 306, performs decompression processing if in the case of compressed image data, and stores generated bitmap data in an image buffer 305.

An output control unit 309 converts the bitmap data stored in the image buffer 305 into a video signal based on an instruction of the printing control unit 307, and outputs the video signal to the printing mechanism unit 220.

The printing mechanism unit 220 is a mechanism for printing the video signal received from the output control unit 309 on a recording sheet, and is also referred to as a printer engine.

Figure 5:
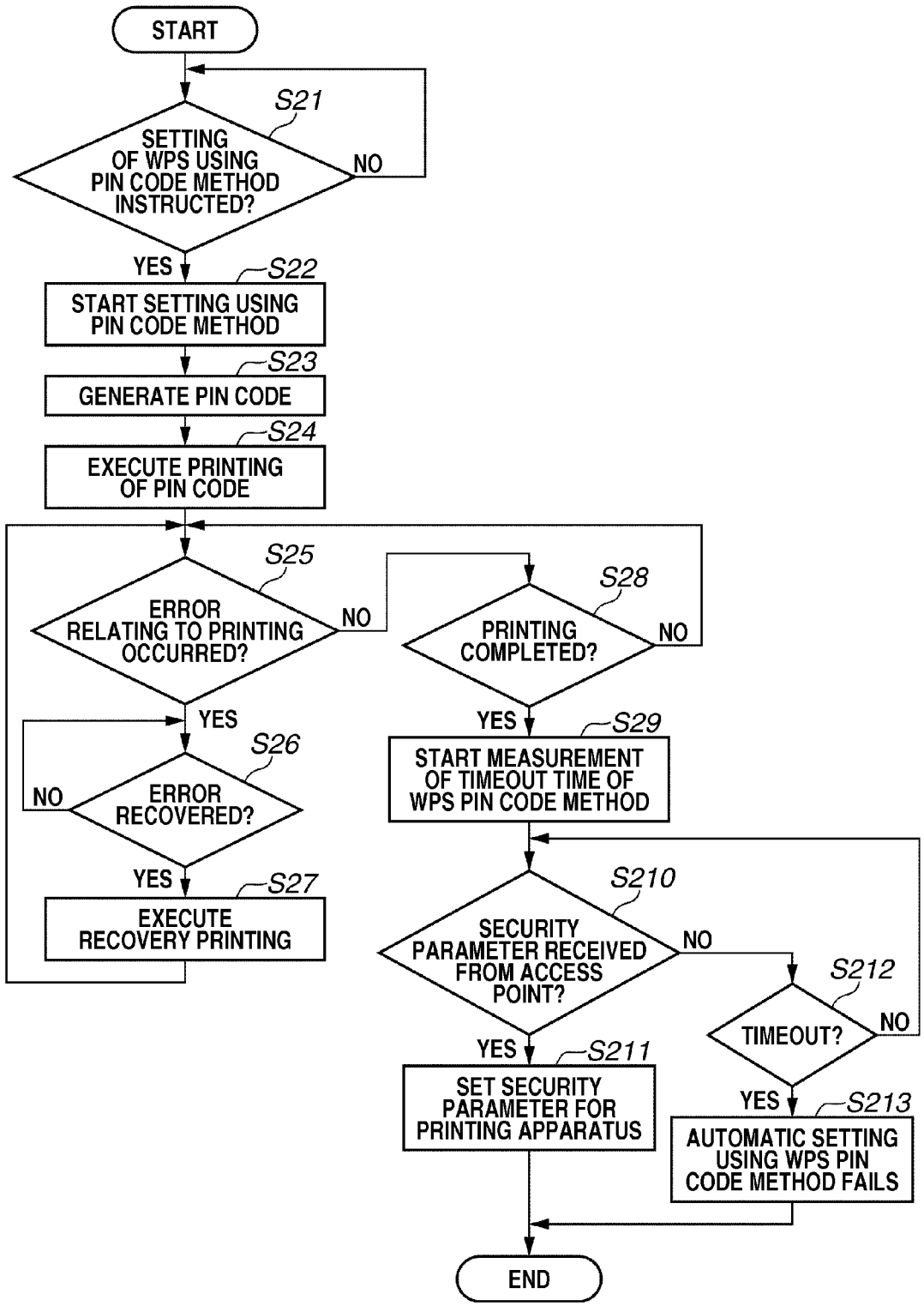
FIG. 5 is a flowchart illustrating a control procedure of the LBP.

FIG. 5 is a flowchart illustrating automatic setting processing of wireless LAN security using the WPS in the PIN code method in the printer 200. The CPU 201 reads a program for executing processing in the flowchart which is stored in the ROM 203 into the RAM 202 and analyzes the program. Thus, the CPU 201 executes the processing The printer 200 according to the present exemplary embodiment is premised on complying with the WPS which is a protocol for automatically performing security setting relating to the wireless LAN communication.

First, in step S21, the CPU 201 waits for an instruction to start activation of the WPS in the PIN code method to be issued from an operation panel 230. The instruction is generally issued by operating a key provided on the operation panel 230 in the printer 200.

Depending on a model of the access point 500, it is necessary to perform setting of the WPS in the PIN code method or an operation for starting the setting of the WPS, in advance of the processing in step S21. In the case of communicating with such an access point, necessary processing is performed on the access point side before step S21 (namely, before issuing the instruction to start activation of the WPS on the printer side). Then, the processing proceeds to step S21.

When start of activation of the WPS in the PIN code method is instructed by the printer 200, in step S22, automatic setting is performed with use of the WPS in the PIN code method. More specifically, the printer 200 searches for an access point, and if at least one access point is found, the printer 200 instructs the access point to start activation of the WPS. If a plurality of access points is found, the printer 200 instructs all the plurality of access points to start activation of the WPS. Accordingly, an access point 300 recognizes the printer 200 as a new wireless LAN device, and waits for transmission of a PIN code from the printer.

Next in step S23, the CPU 201 instructs the printing mechanism unit 220 to generate a PIN code. A generation method for a PIN code is not especially limited, however, it is desirable that a different PIN code can be generated every time from a viewpoint of security (namely, a different PIN code is generated each time an instruction is issued in step S21).

In step S24, the CPU 201 issues an instruction to execute printing of the generated PIN code, thus the printing mechanism unit 220 outputs a printed material on which the PIN code is printed. Further, the CPU 201 transmits the generated PIN code to the access point 500. A printing result of the PIN code is illustrated in FIG. 6 as an example when the PIN code is printed in step S24.

Figure 6:
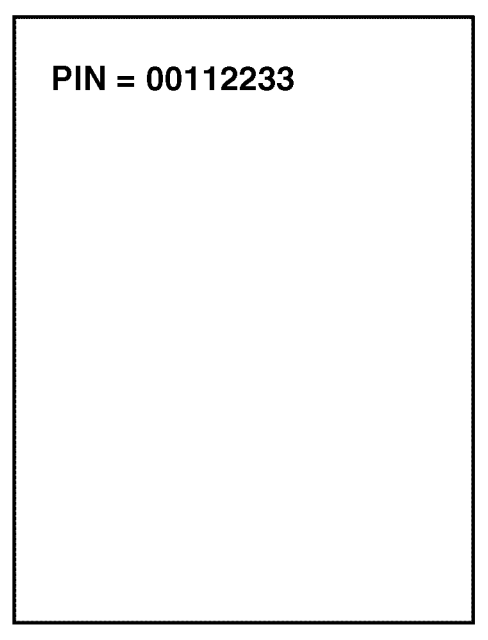

As illustrated in FIG. 6, by outputting the printed material on which the PIN code is printed, the security setting of the wireless LAN using the PIN code method can be implemented in the printing apparatus that does not include a display device like LCD.

In step S25, the CPU 201 checks whether an error has occurred when the PIN code is printed. Specifically, the error here is a case where sheets are not stored in the sheet feed cassette 735 (i.e., out-of-paper error), a case where paper clogging occurs (i.e., paper jam error) during discharge of the sheet on which the PIN code is printed from the printer 200, and the like. If such an error is detected (YES in step S25), the processing proceeds to step S26, and the CPU 201 waits until the printer 200 is recovered from the error by the user's operation.

Upon detecting recovery from the error (YES in step S26), in step S27, the CPU 201 executes printing of the PIN code (reprinting in the case of a jam error), and the processing returns to step S25.

A PIN code to be reprinted in the case of a jam error needs to be the same PIN code as the PIN code printed in step S24. Because, since the PIN code has been already transmitted from the printer 200 to the access point 500 in step S24, if the PIN code transmitted in step S24 is not printed and the user does not visually check it, authentication at the access point 500 will fail.

In step S28, the CPU 201 checks whether printing of the PIN code is properly completed. If the CPU 201 confirms that printing of the PIN code is properly completed (YES in step S28), the processing proceeds to step S29. In step S29, the CPU 201 starts time-out measurement of the WPS in the PIN code method. Then, the CPU 201 waits for reception of a security parameter (specifically, SSID, a WEP/WPA key, or the like) of the wireless LAN transmitted from the access point within a predetermined time (also referred to as time-out time) from start of the time-out measurement. According to the present exemplary embodiment, if the printed sheet on which the PIN code is printed is discharged to the outside of the printer 200, it is determined that the printing is properly completed.

In this way, according to the present exemplary embodiment, measurement of the time-out time is started after completion of the printing of the PIN code in step S28. In other words, according to the present exemplary embodiment, since the time-out time is measured in consideration of the printing of the PIN code, there is no setting failure of the WPS due to the time-out even if an out-of-paper error or a jam error occurs in the midst of setting of the WPS. In other words, setting failure of the WPS may be suppressed at least until the PIN code is properly printed.

In step S210, if the security parameter is received from the access point within the predetermined time (YES in step S210), the processing proceeds to step S211. In step S211, the CPU 201 sets the received security parameter to the printing apparatus as information necessary for performing the wireless communication, and automatic setting with use of the WPS in the PIN code method is successfully implemented. The time-out time may be uniquely specified, or may be any arbitrary value.

On the other hand, if the security parameter is not received (NO in step S210), in step S212, the CPU 201 determines whether the time-out is confirmed. More specifically, the CPU 201 determines whether the time-out is confirmed by checking whether the time-out time has elapsed from the start of measurement in step S29. If the time-out is confirmed (YES in step S212), in step S213, the setting of the WPS in the PIN code method fails. If the setting of the WPS fails, it is necessary to restart the processing from step S21.

According to the descriptions of the first exemplary embodiment, at the time of execution of the WPS in the PIN code method, measurement of the time-out time is started by confirming the success in the printing of the PIN code. Therefore, if an out-of-paper error or a jam error occurs, the time-out does not expire during the error recovery, and the WPS in the PIN code method does not fail. In addition, if the error is resolved, execution of the WPS may be continued, and there is no need to restart the WPS in the PIN code method from the beginning. Therefore, there are effects that a user can save the time and effort to execute again the WPS in the PIN code method, and sheets for printing the PIN code are not wasted.

According to the first exemplary embodiment, a configuration for starting measurement of the time-out time after completion of the printing of the PIN code as a measurement method of the time-out time is described. However, the following measurement method of the time-out time may be used.

Measurement of the time-out time is started in response to an instruction to execute the WPS in the PIN code method is issued in step S21 in FIG. 5. In step S25, if it is determined that an error relating to the printing has occurred (YES in step S25), the measurement of the above-described time-out time currently being performed is stopped temporarily. In steps S26 and S27, the interrupted time measurement may be resumed in response to recovery of the error and execution of proper printing.

The modified example described herein intends to suppress setting failure of the WPS by interrupting measurement of the time-out time, when an error relating to the printing of the PIN code occurs.

Further, the present exemplary embodiment can be applied to various forms other than the modified example described above, as long as measurement of the time-out time of the WPS is performed in consideration of printing processing of the PIN code. For example, the present exemplary embodiment may store a time period from occurrence to resolution of an error relating to the printing, and extend the time-out time by the stored time period.

According to the first exemplary embodiment, concurrently with the activating operation of the WPS in the PIN code method by a user, an operation of the WPS in the PIN code method is started, and the access point 500 is in a state of waiting for an input of a PIN code (step S22 in the flowchart in FIG. 5). However, a PIN code is not actually input to the access point 500 until printing of the PIN code is executed. Therefore, according to a second exemplary embodiment, not only measurement of the time-out, but also an operation of the WPS in the PIN code method (that is, instruction to start activation of the WPS to the access point) are started after detecting a success in printing of the PIN code. The second exemplary embodiment is described focusing on difference from the first exemplary embodiment with reference to a flowchart in FIG. 7. A system configuration and a printer configuration to which the second exemplary embodiment can be applied are similar to those in the first exemplary embodiment, and therefore descriptions thereof are not repeated.

First, in step S31, the CPU 201 waits for an instruction to start the WPS in the PIN code method to be input by the user. If an instruction to start the WPS in the PIN code method is input by the user (YES in step S31), in step S32, the printer 200 generates a PIN code, and in step S33, executes printing of the PIN code. The processing in steps S34 through S37 to the PIN code printing is completed is similar to the processing in steps S25 through S28 in FIG. 5 according to the first exemplary embodiment, and therefore descriptions thereof are not repeated.

In step S37, if it is confirmed that the printing of the PIN code is properly completed (YES in step S37), in step S38, the CPU 201 starts an operation of the WPS in the PIN code method and transmits an instruction to start activation of the WPS to the access point 500. At that time, the CPU 201 transmits the PIN code generated in step S32 to the access point 500. Next in step S39, the CPU 201 starts measurement of the time-out. The processing in step S310 for waiting for an input of the PIN code and in the subsequent steps are similar to the processing in step S210 and the subsequent steps in FIG. 5 according to the first exemplary embodiment, and therefore descriptions thereof are not repeated.

According to the descriptions of the second exemplary embodiment, in a state where a user is not notified of a PIN code, that is, insofar as the printing of the PIN code is not completed, the WPS in the PIN code method is not operated, and thus the PIN code is not transmitted to an external access point. Accordingly, time for waiting an input of the PIN code on the access point side after the PIN code is transmitted from the printer to the access point can be made as short as possible. Consequently, useless authentication waiting time at the access point 500 is also reduced. In addition, the authentication waiting time on the access point 500 side is shortened, and thus security can be improved against an access from the outside with the aim of illegal wireless connection. Setting failure of the WPS due to occurrence of the time-out on the access point 500 side can also be reduced.

According to the second exemplary embodiment, a PIN code printed after recovery of the error in step S36 may be a PIN code different from the PIN code generated in step S32. If the PIN code used when recovery printing is performed in step S36 is separated from the PIN code generated in step S32, the PIN code printed in step S36 is used as the PIN code to be transmitted to the access point 500 in step S39 in place of the PIN code generated in step S33.

According to a third exemplary embodiment, a validated time of a PIN code (time at which the WPS in the PIN code method fails due to time-out) together with the PIN code, as illustrated by an example in FIG. 8, is printed at the time of printing the PIN code. Instead of the validated time, a time-out time of input of the PIN code may be printed like "Please input the PIN code to the access point within ten minutes after printing the PIN code".

According to the descriptions of the third exemplary embodiment, a validated time or a validated period of the printed PIN code can be recognized. Accordingly, there are effects that a user can recognize until what time the PIN code is valid, in other words, by what time the user needs to input the PIN code to the access point to avoid failure of the WPS, and thus the usability can be improved.

Aspects of the present invention can also be realized by a computer of a system or apparatus (or devices such as a CPU or an MPU) that reads out and executes a program recorded on a memory device to perform the functions of the above-described embodiments, and by a method, the steps of which are performed by a computer of a system or apparatus by, for example, reading out and executing a program recorded on a memory device to perform the functions of the above-described embodiments. For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2011-267848 filed Dec. 7, 2011, which is hereby incorporated by reference herein in its entirety.

What is claimed is:

1. A printing apparatus comprising:
an instruction unit configured to input an instruction to start setting of wireless communication with use of a personal identification number (PIN) code method;
a generation unit configured to generate a PIN code in response to the input of the instructions;
a printing unit configured to print the generated PIN code;
a determination unit determines whether an error has occurred when the PIN code is printed, and whether the printing of the generated PIN code is properly completed;
a transmission unit configured to transmit information including the generated PIN code to outside, after the determination unit determines printing of the generated PIN code by the printing unit is properly completed; and
a setting unit configured to perform the setting of the wireless communication, as a response to the information transmitted by the transmission unit, based on a security parameter received from an access point within a predetermined period of time,
wherein the setting unit cancels the performance of the setting of the wireless communication in a case where a security parameter has not been received within the predetermined period of time, and
wherein measurement of the predetermined period of time is not started unless the printing unit properly completes the printing of the generated PIN code.

2. The printing apparatus according to claim 1 further comprising a measurement unit configured to start measurement of time, in response to the transmission unit transmitting the generated PIN code.

3. The printing apparatus according to claim 1, further comprising the determination unit configured to, in a case where a sheet is not stored in the printing apparatus, determine that an error has occurred during printing of the generated PIN code by the printing unit.

4. The printing apparatus according to claim 3, wherein in a case where a sheet on which the generated PIN code has been printed is not properly discharged, the determination unit determines that an error has occurred during printing of the generated PIN code.

5. The printing apparatus according to claim 1, wherein the printing unit prints the generated PIN code and a validated period of the generated PIN code.

6. A method for controlling a printing apparatus, the method comprising:
inputting an instruction to start setting of wireless communication with use of a PIN code method;
generating a PIN code in response to the input of the instructions;
printing the generated PIN code;
determining whether an error has occurred when the PIN code is printed, and whether the printing of the generated PIN code is properly completed
transmitting information including the generated PIN code to outside, after determining printing of the generated PIN code is properly completed;
performing the setting of the wireless communication, as a response to the information transmitted, based on a security parameter received from an access point within a predetermined period of time,
wherein the performing of the setting of the wireless communication in a case where a security parameter has not been received within the predetermined period of time is cancelled, and
wherein measuring of the predetermined period of time is not started unless the printing of the generated PIN code is properly completed.

7. A non-transitory computer-readable storage medium that stores a program for causing a computer to serve as each of units in the printing apparatus according to claim 1.

* * * * *